(12) United States Patent
Al Khawaja et al.

(10) Patent No.: US 11,860,384 B1
(45) Date of Patent: Jan. 2, 2024

(54) FORMING ACOUSTO-OPTIC LENSES USING SPHERICAL ACOUSTIC WAVES IN FLUIDS

(71) Applicant: United Arab Emirates University, Al Ain (AE)

(72) Inventors: Usama Al Khawaja, Al Ain (AE); Laila Al Sakkaf, Al Ain (AE)

(73) Assignee: UNITED ARAB EMIRATES UNIVERSITY, Al Ain (AE)

( * ) Notice: Subject to any disclaimer, the term of this patent is extended or adjusted under 35 U.S.C. 154(b) by 0 days.

(21) Appl. No.: 17/814,696

(22) Filed: Jul. 25, 2022

(51) Int. Cl.
*G02B 3/12* (2006.01)
*G02F 1/33* (2006.01)

(52) U.S. Cl.
CPC .............. *G02B 3/12* (2013.01); *G02F 1/33* (2013.01)

(58) Field of Classification Search
CPC ... G02B 3/12; G02B 3/14; G02B 3/00; G02B 3/0081; G02B 3/0087; G02B 7/023; G02B 27/0025; G02B 27/0927; G02F 1/33; G02F 1/332; G02F 1/29; G02F 1/294; G02F 1/113; G02F 1/1393; G02F 2201/58; G02F 2203/18; G02F 2203/28
USPC ................ 359/665, 666, 675, 305, 310–312, 359/285–287
See application file for complete search history.

(56) References Cited

U.S. PATENT DOCUMENTS

2017/0052425 A1* 2/2017 Arnold ................. G02B 3/0081

FOREIGN PATENT DOCUMENTS

JP 2013061549 * 4/2013 ............... G02B 3/14

OTHER PUBLICATIONS

Chen et al "Photoacoustic tomography imaging based on a 4f acoustic lens imaging system", Optics Express, vol. 15, No. 8, Apr. 16, 2007, p. 4966 (Year: 2007).*
English translation of JP 2013061549. (Year: 2013).*

* cited by examiner

*Primary Examiner* — Jie Lei
(74) *Attorney, Agent, or Firm* — Hayes Soloway PC

(57) ABSTRACT

There is disclosed a spherical optical lens formed in a liquid or a gas, the spherical optical lens is formed by refractive index modulations associated with an acoustic wave, wherein a spherical aberration and focal length of the acoustic wave are controllable. Also disclosed is a method of forming an acousto-optic spherical lens in a homogeneous medium, comprising the steps of introducing an alteration in a refractive index of the medium using acoustic field of a spherical wave, thereby forming a shape of the acousto-optic spherical lens, passing an optical beam through the altered or perturbed medium, exposing the optical beam to a modulated refractive index owing to an inner most wave front of the altered or perturbed medium being accompanied with high pressure modulation, thereby resulting in bending of the optical beam.

13 Claims, 8 Drawing Sheets

FORMING ACOUSTO-OPTIC LENSES USING SPHERICAL ACOUSTIC WAVES IN FLUIDS

FIELD OF THE INVENTION

The present invention relates to the field of forming optical spherical lens, and more particularly to forming acousto-optic lenses using spherical acoustic waves in fluids.

BACKGROUND OF THE INVENTION

Background description includes information that will be useful in understanding the present invention. It is not an admission that any of the information provided herein is prior art or relevant to the presently claimed invention, or that any publication specifically or implicitly referenced is prior art.

A convex lens is a converging lens. When parallel rays of light pass through a convex lens the refracted rays converge at one point called the principal focus. The distance between the principal focus and the centre of the lens is called the focal length.

Considering traditionally implemented methods—the mechanism of light converging is different than other known mechanisms, such as the chirped acoustic linear wave, or the so-called TAG lens which uses cylindrical acoustic waves where the light bending is occurring at a sharp boundary between the region of the acoustic field and the background. The tunable acoustic gradient index of refraction lens (or TAG lens) is an adaptive optics device filled with a fluid and driven by an acoustic wave. The very fast refractive index change induced results in a lens with tunable focal length at kHz rates, with applications in imaging and beam shaping.

The present invention deals with proposing an alternative method for converging light rays, which overcomes drawbacks faced by traditionally implemented lens.

SUMMARY OF THE INVENTION

Therefore it is an object of the present invention to develop an alternative method of using acoustic waves in liquids or gases to converge light rays, which overcomes the drawbacks faced by traditionally employed lens.

There is disclosed a spherical optical lens formed in a liquid or a gas, the spherical optical lens is formed by refractive index modulations associated with an acoustic wave, wherein a spherical aberration and focal length of the acoustic wave are controllable.

In another embodiment of the present invention, the acoustic wave is a spherical acoustic wave propagating in a fluid.

In another embodiment of the present invention, the spherical optical lens is used in a liquid or a gas to converge light.

In another embodiment of the present invention, the spherical aberration and focal length of the spherical acoustic wave are controllable by adjusting a frequency of the acoustic wave.

In another embodiment of the present invention, the spherical aberration and focal length of the spherical acoustic wave are controllable by adjusting an intensity of the acoustic wave.

In another embodiment of the present invention, the spherical optical lens obeys the thin lens laws predicting image properties.

In another embodiment of the present invention, the image properties are location and magnification of the image.

In another embodiment of the present invention, the spherical optical lens is realized in liquids with acoustic pressures less than the atmospheric pressure.

In another embodiment of the present invention, the spherical optical lens is realized in gases using a multi-source acoustic wave, or by light rays of frequency near the resonance, or by considering nonlinear effect of the gas in presence of a high intensity optical beam.

In another embodiment of the present invention, a high-magnification microscope is obtained using two spherical acoustic sources.

As another aspect of the present invention—a method of forming an acousto-optic spherical lens in a medium is disclosed, the method comprising the steps of introducing an alteration in a refractive index of the medium using acoustic field of a spherical wave, thereby forming a shape of the acousto-optic spherical lens, passing an optical beam through the altered or perturbed medium, exposing the optical beam to a modulated refractive index owing to an inner most wave front of the altered or perturbed medium being accompanied with high pressure modulation, thereby resulting in bending of the optical beam.

In another embodiment of the present invention, the medium is a homogeneous medium such as a liquid or a gas.

In another embodiment of the present invention, the liquid is water or glycerin.

BRIEF DESCRIPTION OF THE DRAWINGS

The subject matter that is regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

DETAILED DESCRIPTION OF THE INVENTION

Figure 1:
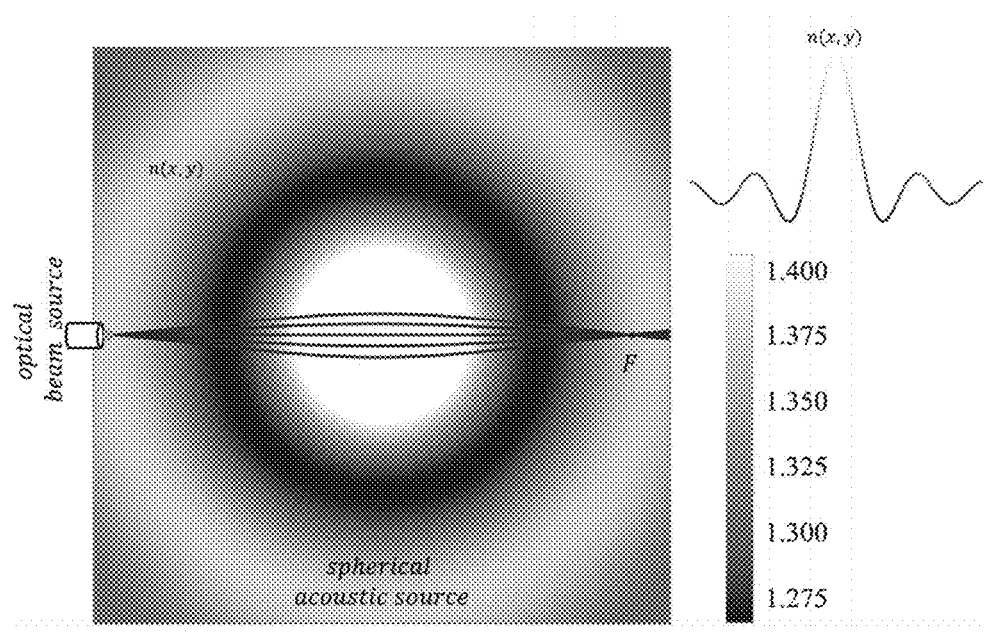
FIG. 1 shows optical beam lensing in a medium perturbed by a spherical acoustic wave. Paths are obtained by solving Equation 14 with parameters: $c=1481\times10^2$ cm/s, $\delta n=0.5$, $f=15$ kHz, $n_0=1.333$.

The aspects of forming acousto-optic lenses using spherical acoustic waves in fluids as proposed according to the present invention will be described in conjunction with FIGS. 1-9b. In the Detailed Description, reference is made to the accompanying figures, which form a part hereof, and in which is shown by way of illustration specific embodiments in which the invention may be practiced. It is to be understood that other embodiments may be utilized and logical changes may be made without departing from the scope of the present invention. The following detailed description, therefore, is not to be taken in a limiting sense, and the scope of the present invention is defined by the appended claims.

Using acoustic waves in liquids to converge light rays is an established idea both theoretically and experimentally. However, using spherical acoustic waves (in particular) in liquids or gases to converge light has not been considered previously. The present invention shows that refractive index modulations caused by a spherical acoustic wave result in a region within the fluid which acts as a lens, which is termed as acousto-optic spherical lens. In the present proposal, light bending is continuous as the light ray propagates through the position-dependent refractive index. The proposed lens obeys the thin lens laws perfectly for the image location and magnification. Furthermore, it is demonstrated that optical instruments, such as a microscope, may be constructed using a number of acoustic waves. The feasibility of the proposed invention is shown for both liquids and gases.

The present invention deals with forming an acousto-optic spherical lens made of a spherical acoustic wave propagating in a fluid. The acoustic wave introduces an alternation in the refractive index of the medium such that an optical lens is formed. An optical beam passing through the perturbed medium will be exposed to the modulated refractive index causing it to bend. The most inner wave front is accompanied with the largest pressure modulation, and thus, it creates a region where the largest modulation of refractive index is attained. This region forms the shape of the lens. The focal length of the formed lens is controlled by adjusting the frequency or the intensity of the spherical acoustic wave. Spherical aberration is also adjustable by the frequency or the intensity of the acoustic wave and may be reduced significantly. The idea was shown to be feasible for liquids with two examples, namely water and glycerin. For gases, extremely high acoustic pressures are needed to realize this effect. However, we propose different mechanisms to realize the acousto-optic lensing in gases. Reasonable focal lengths with extremely small spherical aberration were obtained with acoustic pressures less than the atmospheric pressure.

Moreover, effective and precise performance of the proposed lens can be exploited to form acoustic-optic instruments such as microscopes and telescopes. A high-magnifying microscope was shown to form out of two acoustic wave sources with different frequencies, namely $f_1$=15 kHz and $f_{2=10}$ kHz.

The mechanism of light converging is different than other known mechanisms, such as the chirped acoustic linear wave, or the so-called TAG lens which uses cylindrical acoustic waves where the light bending is occurring at a sharp boundary between the region of the acoustic field and the background. In the present proposal, light bending is continuous as the light ray propagates through the position-dependent refractive index. While converging of light rays as a result of the refractive index modulation associated with spherical acoustic waves is anticipated, it is not obvious that refractive index modulation will result in converging light rays as a conventional lens does. It is verified using the Fermat's principle that the proposed lens performs exactly as a conventional lens with a precise focal point that has a controllable spherical aberration comparable to that of thin lenses. The proposed lens obeys the thin lens laws for the image location and magnification. Furthermore, it is demonstrated that optical instruments, such as a microscope, can be constructed using a number of acoustic waves. The feasibility of the new idea was investigated for some liquids and gases where the acoustic wave pressure and frequency needed to produce lenses of reasonable focal length are calculated. For instance, a spherical acoustic wave in water with frequency 11 kHz and acoustic pressure 195 kPa generates a converging lens of focal length of 10 cm and longitudinal spherical aberration 0.034 cm.

The nontrivial profile of refractive index modulations generates remarkably an effective lens with precise and efficient performance similar to that of conventional lenses. This saves the effort of manufacturing conventional solid lenses. The proposed lens will be kind of 'portable' lens where it can be set up and dismantled at desired times and places. Another aspect of novelty is the control on the focal length using the acoustic wave frequency. This feature introduces the additional flexibility for lenses to be used in scanning purposes or any other application where a lens with adjustable focal lens is needed. The proposed idea is supported by real-life calculations where it is shown that it is indeed feasible for liquids. Mechanisms are also proposed to realize the acousto-optic spherical lens in air.

In geometrical optics, Fermat's principle states that a light ray takes the path of the least travel time. In the case of a medium homogeneous in pressure, temperature, and density, e.g. ordinary air, the refractive index is constant, n=$n_0$. The least time path in the homogeneous medium is accompanied with the shortest distance path, which is represented by a straight line relationship, y(x)=constant. Acoustic waves are pressure disturbance waves that travel through a medium. When a point source of acoustic wave is immersed in a homogeneous medium with refractive index no, the associated pressure perturbations modulate the refractive index of the medium. The high pressure areas (compressions) are associated with slightly higher refractive index than the low pressure areas (rarefactions). The alternation in the pressure of the medium induces an analogous alternation in the refractive index. The refractive index, n=n(x, y), may then vary with the position, x, and the light path, y(x). In such a case, the path of least time will not necessarily be the one of the shortest distance. According to the Fermat's principle, the shortest travel time, Δt, is defined by Equation 1:

$$\Delta t = \int_A^B dt = \int_A^B \frac{ds}{v} = \qquad (1)$$

$$\int_A^B \frac{n(x,y)}{c} ds = \int_A^B \frac{n(x,y)}{c} \sqrt{dx^2 + dy^2} = \frac{1}{c} \int_A^B n(x,y) \sqrt{1+y'^2}\, dx$$

where dt is the time taken to travel through an element of distance ds starting at position A and ending at B with speed v, c is the speed of light in vacuum, and (·)' denotes a derivative with respect to x.

When a homogeneous medium of refractive index $n_0$ is perturbed by a spherical acoustic wave, the resulting refractive index of the medium takes the form defined in Equation 2:

$$n(x,y) = n_0 + \delta n \frac{\sin(kr)}{r} \qquad (2)$$

where $\delta n$ is the maximum change in the refractive index of the medium due to the acoustic wave and is given in Equation 9 below in terms of the acoustic pressure, P. Here, $k = 2\pi/\lambda$, $\lambda = v/f$ is the wavelength, f is the frequency of the acoustic wave, and the source of the acoustic wave is assumed to be centered at the origin, r=0, where $r = \sqrt{x^2+y^2}$. An optical beam traveling from point A to point B in such a perturbed medium, follows a path y(x) with refractive index given by (2). The optical path is then determined by the Euler equation (Equation 3):

$$\frac{\partial}{\partial y}\left[n(x,y)\sqrt{1+y'^2}\right] - \frac{d}{dx}\frac{\partial}{\partial y'}\left[n(x,y)\sqrt{1+y'^2}\right] = 0. \qquad (3)$$

Substituting Equation 2 in Equation 3 yields a lengthy nonlinear ordinary differential equation for y(x), which is presented as Equation 14, for convenience. Numerical simulations based on this differential equation show that variations of the refractive index due to the spherical acoustic wave bend the optical beam, just as a conventional lens does. In FIG. 1, the setup is described for an example of light rays converged by the acoustic field.

Figure 2:
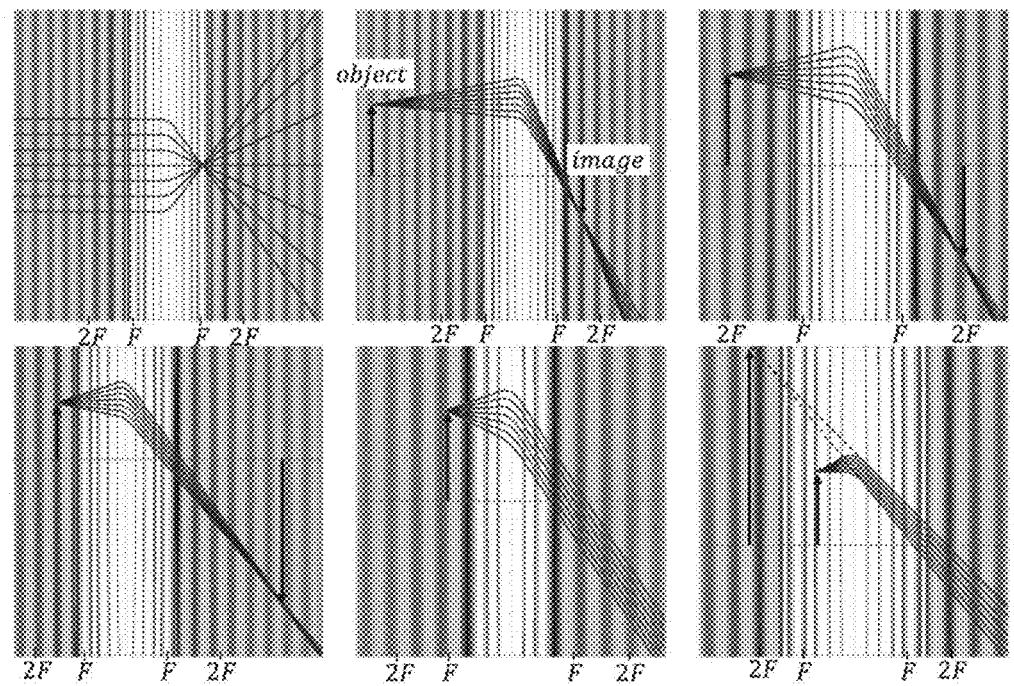
FIG. 2 shows image formation by the acousto-optic spherical lens with $F=22.305$ cm. Parameters used: $c=1481\times10^2$ cm/s, $y_o=1.0$ cm, $\delta n=0.1$, $f=15$ kHz, $n_0=1.333$, $P=39.039$ kPa.

In another embodiment of the present invention, numerical simulations were conducted using thin lens laws for the acousto-optic spherical lens which show that the proposed lens obeys all laws of conventional lenses that determine the location, size, orientation, and type of image. This is verified by considering all significantly different possible locations of the object. The simulation results are shown in FIG. 2. A beam of rays parallel to principal axis converge at the focal point, which is used to define the focal length, F, of the acousto-optic spherical lens, as shown in the left upper subfigure. The other subfigures clearly show how the acousto-optic spherical lens perfectly obeys all the lens laws. Namely, when the object is located at a point beyond 2F, the formed image will be located on the other side of the lens somewhere in between 2F and F, inverted, reduced in size, and real, as shown in the middle upper subfigure. When the object is located at 2F, the formed image will be located at 2F in the opposite side of the lens, inverted with the same size as the object, and real. This is shown in the right upper subfigure. When the object is located at a point in between 2F and F, the formed image will be located somewhere beyond 2F in the opposite side of the lens, inverted, enlarged, and real, as shown in the left lower subfigure. A beam of parallel rays is formed when the object is located at the focal point, F, as shown in the middle lower subfigure. Finally, when the object is located between the focus and the lens, the formed image will be located on the same side of the object, upright, enlarged in size, and virtual. This is shown in the right lower subfigure of FIG. 2.

Figure 3A:
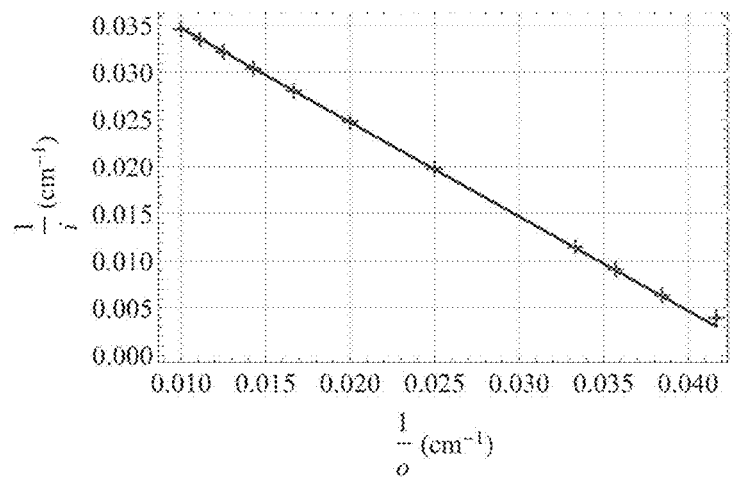
FIG. 3a shows verification of the object-image relation (4) and FIG. 3b the image magnification (5). Points correspond to the simulation results of the acousto-optic spherical lens and lines correspond to the theoretical formulae (4) and (5).
Figure 3B:
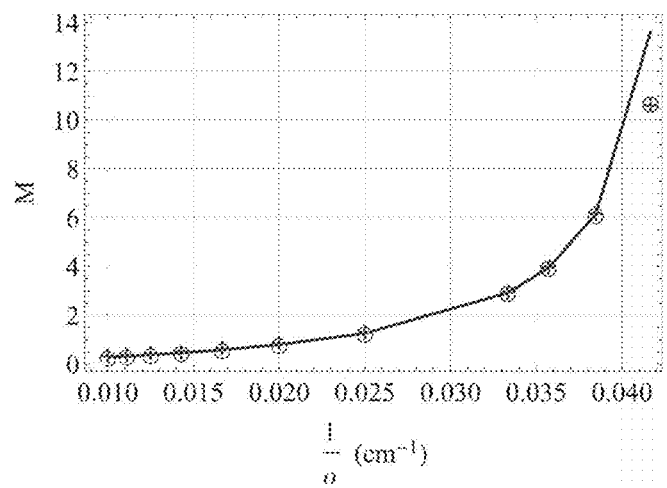
In FIG. 3b, plus signs correspond to $M=-i/o$ and circles correspond to $M=-y_i/y_o$. Parameters used: $c=1481\times10^2$ cm/s, $y_o=0.1$ cm, $\delta n=0.1$, $f=15$ kHz, $n_0=1.333$, $P=39.039$ kPa.
Figure 4:
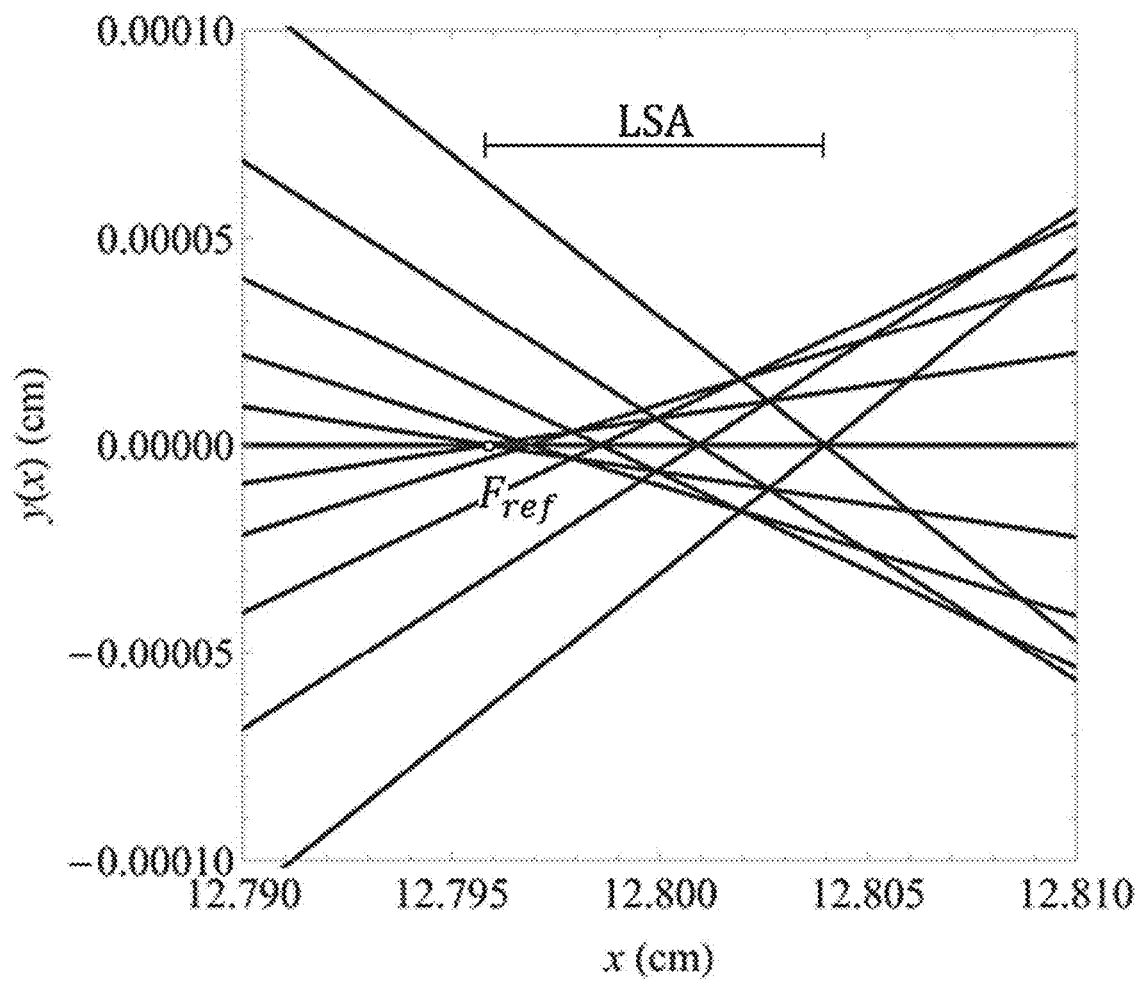
FIG. 4 depicts a zoom in the focus point of the acousto-optic spherical lens showing the spherical aberration. Parameters used: $\delta n=0.1$, $P=39.039$ kPa, $c=1481\times10^2$ cm/s, $n_0=1.333$, $f=12$ kHz.

It is also verified that the acousto-optic spherical lens obeys the thin lens law (as shown in Equation 4) relating the locations of the image, i, and the object, o, $$\frac{1}{F} = \frac{1}{i} + \frac{1}{o}, \qquad (4)$$

as well as the image magnification (as shown in Equation 5), $$M = -\frac{i}{o} = -\frac{y_i}{y_0}, \qquad (5)$$

where $y_i$ and $y_o$ are the image and object sizes, respectively, as shown in FIGS. 3a-3b.

Figure 5A:
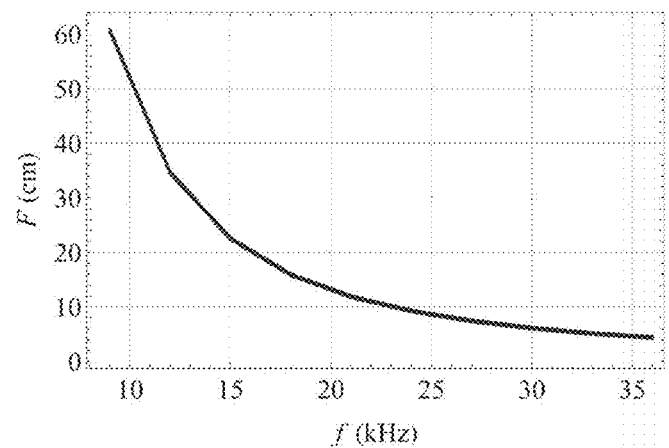
FIG. 5a shows dependence of focal length and FIG. 5b spherical aberration on the frequency of the acoustic wave. Parameters used: $y_o=0.1$ cm, $\delta n=0.1$, $P=39.039$ kPa, $c=1481\times10^2$ cm/s, $n_0=1.333$.

Spherical aberration is one of the main causes preventing a lens from yielding an optimum image. Determining this aberration is therefore fundamental to predicting the quality of formed images. The value of longitudinal spherical aberration (LSA) expresses the variation of the image distance or focal length resulting from different rays. For a conventional lens, LSA can be reduced by reducing the thickness of the lens or equivalently by using smaller area of the lens near its center. The value of LSA is defined in Equation 6 as:

$$\text{LSA} = |F_{ref} - F| \qquad (6)$$

where $F_{ref}$ is the focal length of a reference ray, which is assumed to be infinitesimally close and parallel to the principal axis. The focal length, F, corresponds to another incident ray, which is also parallel to the principal axis. A zoom in the focus point shows in FIG. 4, that similar to conventional lenses, the acousto-optic spherical lens suffers from the spherical aberration problem. The wavefront radius of curvature is given by the wavelength of the acoustic wave, $\lambda$. Since the frequency is inversely proportional to the wavelength, higher frequencies result in smaller radii of curvature. Therefore, one possible way to change the focal length of the proposed lens is by varying the frequency of the spherical acoustic wave. The dependence of focal length on acoustic frequency is shown in FIG. 5a for five rays parallel to the principal axis but with different distances from it. The five curves are almost indistinguishable, which infers the facts that the LSA is extremely small and the focal length is determined only by the parameters of the lens, as it is for conventional lenses. Nonetheless, the small difference between the five curves is obvious in FIG. 5b where we plot the LSA value versus the acoustic frequency.

Figure 5B:
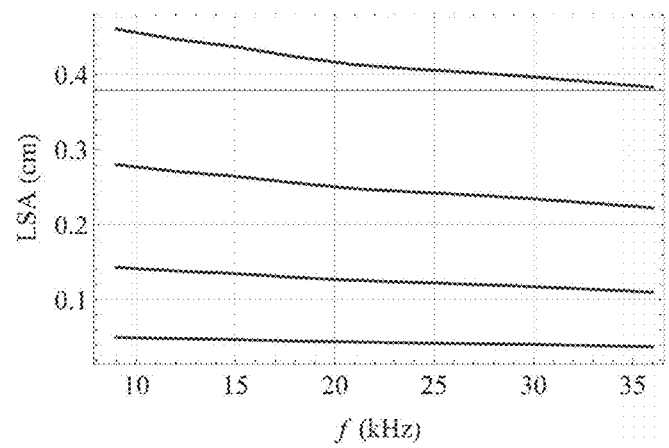
Figure 6A:
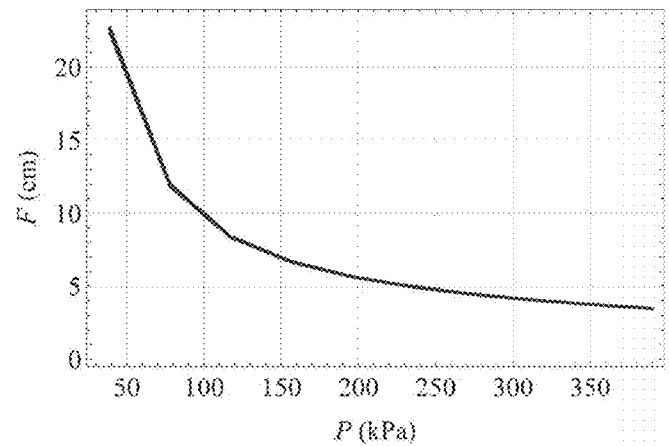
FIG. 6a shows dependence of focal length and FIG. 6b spherical aberration on the acoustic pressure. Parameters used: $y_o=0.1$ cm, $c=1481\times10^2$ cm/s, $n_0=1.333$, $f=15$ kHz.
Figure 6B:
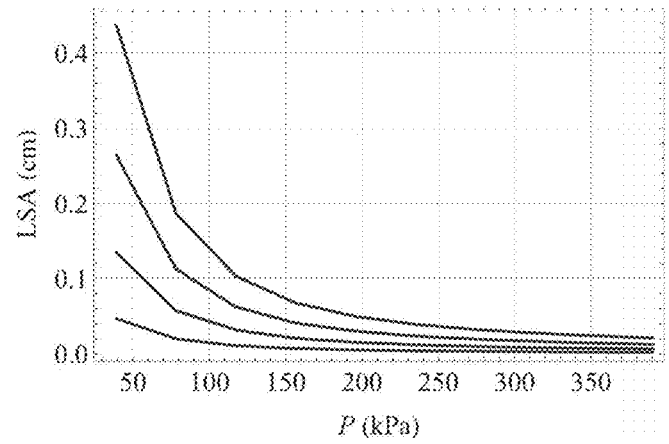

Another possible way to control the focal length of the acousto-optic spherical lens is by varying the intensity of the acoustic wave. The acoustic intensity is directly proportional to the acoustic pressure which accounts for the value of refractive index modulation, Sn. The dependence of the focal length, F, on P for the same five rays shown in FIGS. 5a-5b is plotted in FIG. 6a. The corresponding LSA values are plotted in FIG. 6b. Comparing FIG. 5b with FIG. 6b, a stronger dependence of LSA on P is noticed compared to its dependence on f.

In another embodiment of the present invention, considering the realization of refractive index modulation, the proposed acousto-optic spherical lens is applicable, in principle, to all fluids. However, for gases it is harder to achieve the performance of an optical lens with reasonable values of the acoustic pressure. This is due to the weak response of their refractive index to pressure modulations. For instance, an acoustic pressure of a sound wave in air of magnitude P~1 atm, which is equivalent to 195 dB, the corresponding change in refractive index will be of the order $\delta n \sim 10^{-4}$. With this negligible modulation, converging light rays within a realistic distance will not be possible, and hence, the proposed acousto-optic spherical lens cannot exist in air. On the contrary, the much stronger response of liquids to pressure modulations, renders the acousto-optic spherical lens proposal to be a realistic one. The acoustic-optical interaction (Equations 7 and 8) is described by the Gladstone-Dale relation as $$n = 1 + K\rho, \quad (7)$$

where $$K = \frac{n_0 - 1}{\rho}\left(\frac{P + P_0}{P_0}\right)^{1/\gamma} \quad (8)$$

is the Gladstone-Dale constant which depends on the fluid, $\rho$ (kg/m$^3$) is the mass density of the fluid, $P_0$ (Pa) is the atmospheric pressure, P (Pa) is the acoustic wave pressure, and $\gamma$ is the specific heat ratio. At low acoustic pressure such that P<<$P_0$, the refractive index can be approximated by Equation 9:

$$n = n_0 + \frac{n_0 - 1}{\gamma P_0} P, \quad (9)$$

where the second term of this relation is the modulation in refractive index caused by the acoustic wave, which corresponds to δn in Equation 2. In Table I, we list the values of refractive index modulations resulting from some acoustic pressure values in air, water, and glycerin, at room temperature T=20° C. The table shows clearly that reasonable modulation in the refractive index can indeed be achieved for liquids with sound pressure less than the atmospheric pressure. For gases, δn is typically negligible, as shown by the off-resonance values in Table I. Using light frequency near a certain resonance value results in appreciable refractive index modulation, as shown in near-resonance values in the table. Table I lists the refractive index modulation of air, water, and glycerin at room temperature, T=20° C. Parameters used: $P_0=1.01\times10^5$ Pa, $\gamma=\{1, 1.3, 1.34\}$, $n_0=\{1.00028, 1.333, 1.4\}$, $\rho=\{1.204, 998.23, 1260.00\}$ kg/m$^3$ for air, water and glycerin, respectively, $n_0=1.5$ for air refractive index near resonance.

TABLE I

| | δn | | | |
|---|---|---|---|---|
| | air | | | |
| P (kPa) | off-resonance | near-resonance | water | glycerin |
| 39.9399 | 0.00008 | 0.150 | 0.1 | 0.1192 |
| 79.8799 | 0.00017 | 0.300 | 0.2 | 0.2384 |
| 119.820 | 0.00025 | 0.450 | 0.3 | 0.3577 |

In another embodiment of the present invention, three possible mechanisms are proposed for the acousto-optic spherical lens to be realized as well in gases. I. Resonant refractive index: The refractive index of gases increases resonantly. For light rays of frequency near the resonance, the refractive index can assume values between n=1 and n=2. This deviation from the typical value of $n_0=1.00028$, leads to the required refractive index modulation, as shown in Table I. II. Multi acoustic sources: The conducted simulations have revealed that an array of N closely-separated acoustic sources produces an N-times larger refractive index modulation compared to that of a single source. For instance, if δn=0.01 for a single acoustic source, listing 10 such sources in an array, will result in δn=0.1. It should be noted that the sources are to be aligned along the principal axis. III. Nonlinear effect: Larger modulation in refractive index can, in principle, also be attained with high intensity optical beams similar to the Kerr effect in optical fibers. Nevertheless, very high light intensities should not be used in order not to ionize the gas.

Figure 7:
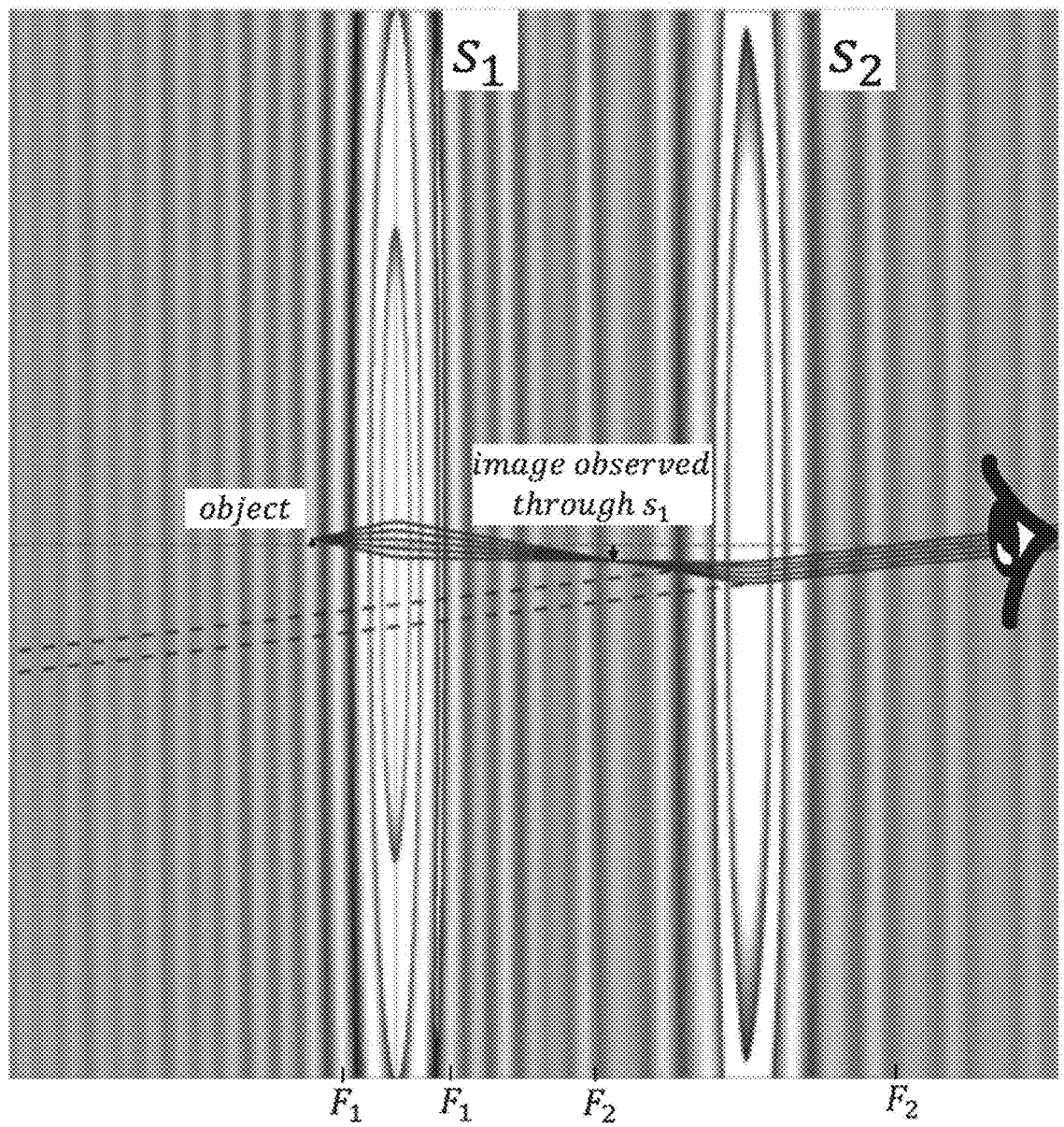
FIG. 7 shows acousto-optic microscope with magnification factor $M=-1191.29$ X. The extensions of light rays meet and form the final image at x=−3.658×10⁴ cm. Parameters used: $f_1$=15 kHz, $f_2$=10 kHz, δn=0.1, $n_0$=1.333, $x_0$=132.6 cm, $y_o$=0.1 cm, o=−30.71 cm.
Figure 8:
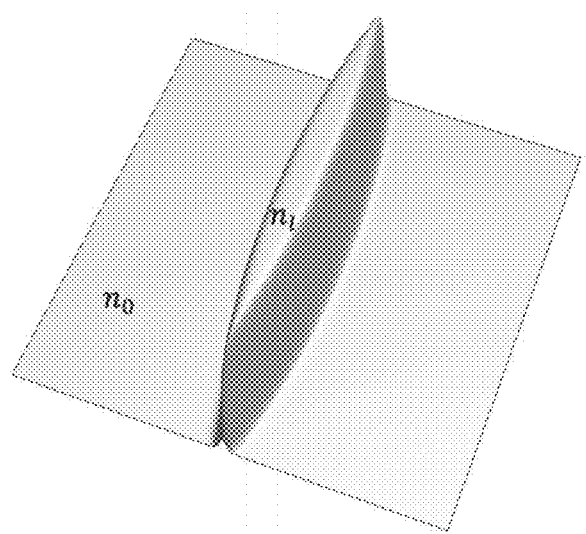
FIG. 8 shows the refractive index profile shown by Equation 11 for a converging lens. Parameters used: $n_0$=1.00028, 8n=0.5, α=10, R=2, $x_0$=1.4.

The proposed acousto-optic spherical lens suggests the possibility of designing different optical instruments such as telescopes and microscopes. The present invention presents as an example, a setup for a microscope with a high-amplifying power. Microscopes may be constructed by two converging lenses. Hence, two acousto-optic spherical lenses are required. In FIG. 7, the setup of the acousto-optic microscope is shown. The change in the refractive index as a result of the existence of two spherical acoustic waves takes the following form (Equation 10):

$$n(x, y) = n_0 + \delta n\left[\frac{\sin(k_1 r_1)}{r_1} + \frac{\sin(k_2 r_2)}{r_2}\right], \quad (10)$$

where $r_1=\sqrt{x^2+y^2}$ and $r_2=\sqrt{(x-x_0)^2+y^2}$, $x_0$ is the separation between the two acoustic sources, $k_{1,2}=2\pi/\lambda_{1,2}$ are the wavenumbers, $\lambda_{1,2}=v/f_{1,2}$ are the wavelengths, and $f_{1,2}$ are the frequencies of the first, $s_1$, and second, $s_2$, spherical acoustic waves, respectively. The mechanism of magnifying in the acousto-optic microscope is identical to that of a conventional microscope. The object is located slightly away from the focus at $F_1$ of the first lens, $s_1$. A real, enlarged, and inverted image is formed and is located at a position slightly less than $F_2$ of the second lens, $s_2$. The formed image plays the role of an object to the second lens, $s_2$. The second formed image will be enlarged, virtual, and located behind the actual object. The height of the object in FIG. 7 is $y_o=0.1$ cm, while the final image has a height of $y_i=119.129$ cm, which gives a magnification of M=−1191.29 X.

In another embodiment of the present invention, considering benchmarking with conventional lenses—theoretical and numerical procedures are tested by considering a conventional (solid) lens. A refractive index profile mimicking that of a solid lens with sharp boundaries is constructed. Since analytical formulae for the focal length and aberration exist in this case, this will provide yet another check on our simulations. The shape of solid lenses is determined by the overlap region between two spheres. This can be 'engineered' mathematically by a linear combination of two hyperbolic tan functions, as follows (Equation 11):

$$n(x, y) =$$

$$\left[n_0 + \frac{\delta n}{2}\left(\tanh\left[\alpha\left(\sqrt{R^2 - y^2} - (x + x_0)\right)\right] + \tanh\left[\alpha\left(\sqrt{R^2 - y^2} + (x - x_0)\right)\right]\right)\right],$$

where no is the refractive index of the background, $\delta n = n_l - n_0$ is the modulation in refractive index, and $n_l$ is the refractive index of the lens. Here, R is the radius of curvature, a is a real constant that tunes the sharpness of the lens edges. The centers of the two spheres are located at $(\pm x_0, 0)$. The refractive index of the lens given by Equation 11 is plotted in FIG. 8. The figure shows that the refractive index of the lens is equal to $n_l$ in the region of overlap between two spheres of radius R. Outside the overlap region the refractive index is $n_0$.

Substituting the refractive index, Equation 11, in the Euler equation, Equation 3, yields again a lengthy nonlinear ordinary differential equation for the path of the beam, y(x), which is presented as Equation 15, for convenience.

Figure 9A:
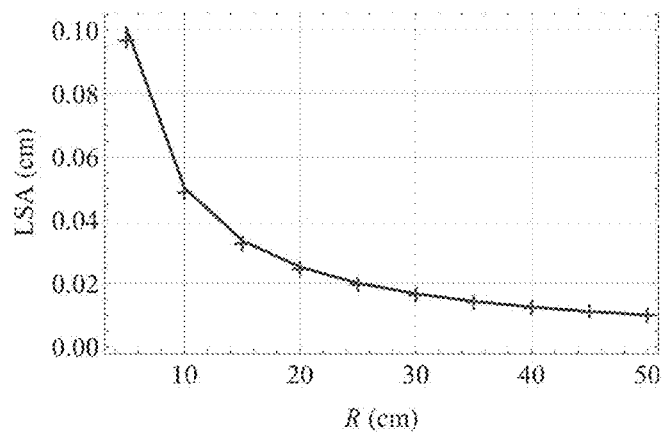
FIG. 9a shows dependence of the focal length and FIG. 9b longitudinal spherical aberration, LSA, on the radius of lens surface curvature for 8n=0.5. Points correspond to the simulation results of the engineered lens (11) and solid lines correspond to the theoretical formulae for focal length (12), and spherical aberration (13). Parameters used: α=55, $n_0$=1.00028, $x_0$=R−1/20, $y_o$=0.1 cm.
Figure 9B:
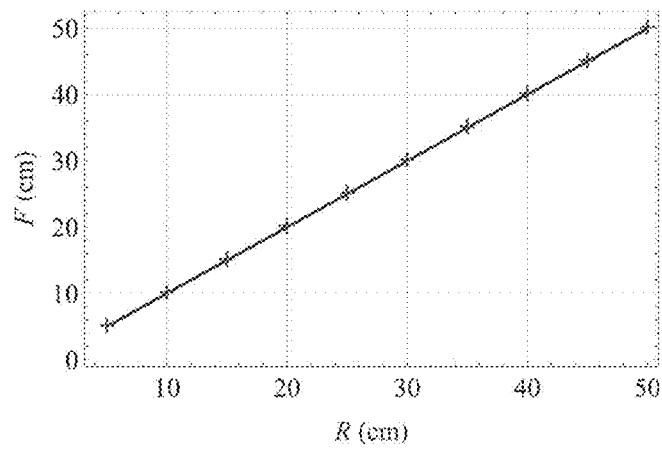

The focal length of the designed lens can be determined analytically using the lens Maker's formula (Equation 12):

$$\frac{1}{F} = \frac{n_l - n_0}{n_0}\left(\frac{1}{R_1} - \frac{1}{R_2}\right), \tag{12}$$

where $R_1$ and $R_2$ are the radii of the two surfaces of the lens. The curvatures of the two surfaces are considered to be identical, $R_1 = -R_2 = R$. The value of LSA for a thin lens takes the form (Equation 13):

$$LSA = \frac{1}{8n_l(n_l-1)}\frac{h^2 i^2}{F^3}\left[\frac{n_l+2}{n_l-1}s^2 + 2(2n_l+2)sp + (3n_l+2)(n_l-1)p^2 + \frac{n_l^3}{n_l-1}\right], \tag{13}$$

where $s = (R_2+R_1)/(R_2-R_1)$ is the Coddington shape factor, $p = (i-o)/(i+o)$ is the Coddington position factor, and h is the height of the farthest ray from the principal axis. In FIG. 9, we plot F and LSA in terms of R. The simulation results for F and LSA obtained from the engineered lens, Equation 11, agree well with the theoretical results calculated using Equations 12 and 13.

Since the pressure modulations of the acoustic wave oscillate in time between positive and negative values, the resulting modulation of refractive index will also be oscillating between positive and negative values. The image is formed by the acousto-optic spherical lens only when the refractive index modulations are positive. For negative modulations, the lens will be diverging. The time average of sinusoidal variations over a period much larger than the period of the oscillation, leads to that the image being formed for only half of the time interval. This results in an image with half intensity as compared with conventional lenses.

Considering light path differential equations, the light ray path in the acoustic field of spherical wave is given by Equation 14, and the light ray path through the solid lens refractive index profile is given by Equation 15 as follows, respectively:

$$\delta n \frac{\sin\left[k\sqrt{x^2+y^2}\right]}{(x^2+y^2)^{3/2}} \tag{14}$$

$$\left(y\sqrt{1+y'^2} - \frac{y'(x+yy')}{\sqrt{1+y'^2}} + \left(1 - \frac{y'^2}{1+y'^2}\right)\frac{y''(x^2+y^2)}{\sqrt{1+y'^2}}\right) +$$

-continued $$\delta n\, k \frac{\cos\left[k\sqrt{x^2+y^2}\right]}{x^2+y^2}\left(\frac{y'(x+yy')}{\sqrt{1+y'^2}} - y\sqrt{1+y'^2}\right) +$$

$$n_0\left(1 - \frac{y'^2}{1+y'^2}\right)\frac{y''}{\sqrt{1+y'^2}} = 0$$

and $$\delta n \frac{\alpha}{2}\text{sech}^2\left[\alpha\left(x+x_0 - \sqrt{R^2-y^2}\right)\right] \tag{15}$$

$$\left(\frac{y\sqrt{1+y'^2}}{\sqrt{R^2-y^2}} - \frac{y'}{\sqrt{1+y'^2}}\left(1 + \frac{yy'}{\sqrt{R^2-y^2}}\right)\right) +$$

$$\delta n \frac{\alpha}{2}\text{sech}^2\left[\alpha\left(x-x_0 + \sqrt{R^2-y^2}\right)\right]$$

$$\left(\frac{y\sqrt{1+y'^2}}{\sqrt{R^2-y^2}} + \frac{y'}{\sqrt{1+y'^2}}\left(1 - \frac{yy'}{\sqrt{R^2-y^2}}\right)\right) +$$

$$\frac{\delta n}{2}\left(\tanh\left[\alpha\left(x-x_0+\sqrt{R^2-y^2}\right)\right] - \tanh\left[\alpha\left(x+x_0-\sqrt{R^2-y^2}\right)\right]\right)$$

$$\frac{y''}{\sqrt{1+y'^2}}\left(1 - \frac{y'^2}{1+y'^2}\right) + n_0 \frac{y''}{\sqrt{1+y'^2}}\left(1 - \frac{y'^2}{1+y'^2}\right) = 0.$$

In conclusion, in accordance with the present invention, most of the traditionally implemented methods/devices deal with solid lenses manufacturing, and none of these references uses the proposed mechanism to focus light.

In the present invention, a spherical acoustic wave is used to converge light rays by creating a modulation in the refractive index similar to that of an optical lens. The function of the present invention is to converge light rays using the acoustic field. The principle of refraction to converge light rays into a single focus point and spherical acoustic waves are used in liquids or gases. A spherical optical lens forms in a liquid or a gas as a result of the refractive index modulations associated with a spherical acoustic wave. A spherical acoustic wave introduces a modulation in the refractive index of the medium. This modulation in refractive index is in a shape of spreading out spheres. The most inner (sphere) wave front is accompanied with a region of the largest refractive index modulation. This region forms a lens shape. An optical beam passing through the perturbed medium will be exposed to the modulated refractive index causing it to bend to a single point.

In accordance with the present invention, the incident light beam is converged at a focal point by traveling through the spherical refractive index modulation caused by the propagation of a spherical acoustic wave. The acousto-optic interaction we present takes place between the optical beam and the spherical acoustic wave. In the present case, the acousto-optic interaction can occur in both transparent liquid and gaseous mediums. The interaction between the optical beam and the spherical refractive index modulation caused by the propagation of the spherical acoustic wave directly results in bending the beam and converging it to a single focal point. The convergent optical beam is obtained without the need of placing a conventional optical lens in the propagation path of the out coming optical beam. Further, since frequency is inversely proportional to the wavelength, higher frequencies of the spherical acoustic wave result in smaller radii of curvature. Therefore, one possible way to change the focal length of the proposed lens is by varying the frequency of the spherical acoustic wave. The spherical aberration of the optical lens is comparable to that of a conventional thin lens. The spherical aberration can be controlled by adjusting the frequency of the acoustic wave and by adjusting the intensity of the acoustic wave. The spherical optical lens obeys the laws of lenses predicting the image properties and relating the location and size of the image and object to the focal length.

The proposed lens is comprised of only a spherical acoustic wave source. This simple lens configuration obeys perfectly all the laws of conventional lenses in predicting the image properties and relating the location and size of the image and object to the focal length. The lens in the present invention converges the optical beam without the need of including any further conventional lenses or prisms. The proposed lens is shown to be feasible in liquid acousto-optic mediums such as water and glycerin and gases such as air. For gases, extremely high acoustic pressures are needed to realize this effect. However, different mechanisms are proposed to realize the acousto-optic lensing in gases. The acousto-optic spherical lens, is realized in gases using light rays of frequencies near certain resonance values, or by using multi-source acoustic wave, or by considering the nonlinear effect of the gas with the presence of a sufficiently intense optical beam. Regarding the technological significance of the present invention, it saves time, effort, and material, needed for manufacturing conventional solid lenses. The proposed lens is a "portable" lens where it can be set up and dismantled at desired times and places. Another aspect is the control on the focal length using the acoustic wave frequency or intensity. This feature introduces the additional flexibility for lenses to be used in scanning purposes or any other application where a lens with adjustable focal length is needed. Advantages associated with the present invention include being easier, faster, cheaper, and more convenient method of manufacturing optical lenses, allowing controllability on the focal length which allows for many of applications, including adaptive optics and scanning machines, as well as controllability on the spherical aberration.

The workability of the proposed invention is verified using the Fermat's principle. This principle is used to run simulations showing that the proposed lens performs exactly as a conventional lens with a precise focal point that has an extremely small controllable spherical aberration. The feasibility of the present invention has also been proved for some liquids and gases (water, glycerin, air) where the acoustic wave pressure and frequency needed to produce lenses of reasonable focal length are calculated. For instance, a spherical acoustic wave in water with frequency 11 kHz and acoustic pressure 195 kPa generates a converging lens of focal length of 10 cm and longitudinal spherical aberration of 0.034 cm.

Many changes, modifications, variations, and other uses and applications of the subject invention will become apparent to those skilled in the art after considering this specification and the accompanying drawings, which disclose the preferred embodiments thereof. All such changes, modifications, variations, and other uses and applications, which do not depart from the spirit and scope of the invention, are deemed to be covered by the invention, which is to be limited only by the claims which follow.

The invention claimed is:

1. A spherical optical lens, the lens comprising:
a solid spherical shell filled with a liquid or a gas;
a spherical acoustic field of standing waves inside the solid spherical shell, the spherical acoustic field of standing waves comprising acoustic waves which are pressure disturbance waves;
at least two windows formed in the solid spherical shell, thereby allowing for propagation of a light beam into and out of the solid spherical shell, wherein a point source of the acoustic waves is immersed in a homogeneous medium, the medium comprising at least one of the liquid and the gas, and associated pressure perturbations modulate refractive index of the homogeneous medium.

2. The spherical optical lens of claim 1, wherein the solid spherical shell is filled with the fluid and a spherical acoustic wave propagates in the fluid.

3. The spherical optical lens of claim 1, wherein the spherical optical lens is in a liquid or a gas and wherein the light beam converges within the solid spherical shell.

4. The spherical optical lens of claim 1, wherein a spherical aberration and a focal length of a spherical acoustic wave in the solid spherical shell the spherical optical lens are controllable by varying or adjusting a frequency of the spherical acoustic wave from the point source of the spherical acoustic wave.

5. The spherical optical lens of claim 1, wherein a spherical aberration and a focal length of a spherical acoustic wave the spherical optical lens are controllable by varying or adjusting an intensity of the spherical acoustic wave, from the point source of the spherical acoustic wave.

6. The spherical optical lens of claim 1, wherein the spherical optical lens obeys the thin lens laws predicting image properties.

7. The spherical optical lens of claim 6, wherein the spherical optical lens obeys the thin lens laws relating the location and size of the image and object to a focal length of the spherical optical lens.

8. The spherical optical lens of claim 1, wherein the solid spherical shell is filled with the liquid with acoustic pressures less than an atmospheric pressure.

9. The spherical optical lens of claim 1, wherein the solid spherical shell is filled with the gas and the light beam uses frequencies near certain resonance values or by a multi-source acoustic wave.

10. The spherical optical lens of claim 1, wherein a high-magnification microscope is obtained using two spherical acoustic sources.

11. A method of forming an acousto-optic spherical lens in a medium, the method comprising the steps of:
filling a solid shell with the medium, wherein the medium comprises at least one of a liquid and a gas;
introducing an alteration in a refractive index of the medium using an acoustic field of a spherical wave, thereby forming a shape of the acousto-optic spherical lens, the acoustic field of the spherical wave comprising acoustic waves which are pressure disturbance waves;
passing an optical beam through the medium;
modulating a refractive index of the medium by subjecting an innermost wavefront of the medium with high pressure modulation;
exposing the optical beam to a modulated refractive index, thereby bending the optical beam, wherein a point source of the acoustic waves is immersed in a homogeneous medium, the medium comprising at least one of the liquid and the gas, and associated pressure perturbations modulate refractive index of the medium.

12. The method of claim 11, wherein the medium is a homogeneous medium of the liquid or the gas.

13. The method of claim 11, wherein medium is liquid and the liquid is water or glycerin.

* * * * *